(12) United States Patent
Ma

(10) Patent No.: US 9,574,042 B2
(45) Date of Patent: Feb. 21, 2017

(54) FUNCTIONALIZED POLYMER, RUBBER COMPOSITION AND PNEUMATIC TIRE

(71) Applicant: THE GOODYEAR TIRE & RUBBER COMPANY, Akron, OH (US)

(72) Inventor: Liqing Ma, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/203,874

(22) Filed: Jul. 7, 2016

(65) Prior Publication Data

US 2016/0376394 A1    Dec. 29, 2016

Related U.S. Application Data

(62) Division of application No. 14/755,533, filed on Jun. 30, 2015, now Pat. No. 9,428,628.

(60) Provisional application No. 62/039,483, filed on Aug. 20, 2014.

(51) Int. Cl.
*C08L 53/00* (2006.01)
*C08L 9/00* (2006.01)
*C08L 25/02* (2006.01)
*B60C 1/00* (2006.01)
*C08F 293/00* (2006.01)

(52) U.S. Cl.
CPC ................ *C08F 293/005* (2013.01)

(58) Field of Classification Search
CPC ..... C08F 297/04; C08F 297/042; C08L 53/02; C08L 53/025; C08L 2666/02; B60C 1/00
USPC ............... 526/95, 98, 241; 524/493
See application file for complete search history.

(56) References Cited

U.S. PATENT DOCUMENTS

2007/0049669 A1 * 3/2007 Korth ................ C08K 5/548
524/188

* cited by examiner

*Primary Examiner* — William Cheung
(74) *Attorney, Agent, or Firm* — John D. DeLong

(57) ABSTRACT

The present invention is directed to a functionalized elastomer having the formula $(P-B_n)_q-X$ where P is a polydiene segment, B is a styrenic monomer residue, n is the number of styrenic monomer residues, and $B_n$ is a polystyrenic segment; X is a multifunctional terminator residue, and q is the number of $(P-B_n)$ chains coupled to X; wherein for q=1, the weight percent of the functionalized elastomer is at least 90 percent by weight.

6 Claims, No Drawings

FUNCTIONALIZED POLYMER, RUBBER COMPOSITION AND PNEUMATIC TIRE

The present patent application is a Divisional Application of Ser. No. 14/755,533 filed Jun. 30, 2015, now issued as U.S. Pat. No. 9,428,629 on Aug. 30, 2016, which claims priority benefit of U.S. Provisional Patent Application Ser. No. 62/039,483 filed Aug. 20, 2014, the entire contents of which are hereby incorporated by reference in their entirety into this disclosure.

BACKGROUND OF THE INVENTION

In recent years, there is a growing demand for functionalized polymers. Functionalized polymers can be synthesized through various living/controlled polymerization techniques. In the living polymerization process based on active carbanionic center, metals from Groups I and II of the periodic table are commonly used to initiate the polymerization of monomers into polymers. For example, lithium, barium, magnesium, sodium, and potassium are metals that are frequently utilized in such polymerizations. Initiator systems of this type are of commercial importance because they can be used to produce stereo regulated polymers. For instance, lithium initiators can be utilized to initiate the anionic polymerization of isoprene into synthetic polyisoprene rubber or to initiate the polymerization of 1,3-butadiene into polybutadiene rubber having the desired microstructure.

The polymers formed in such polymerizations have the metal used to initiate the polymerization at the growing end of their polymer chains and are sometimes referred to as living polymers. They are referred to as living polymers because their polymer chains which contain the terminal metal initiator continue to grow or live until all of the available monomer is exhausted. Polymers that are prepared by utilizing such metal initiators normally have structures which are essentially linear and normally do not contain appreciable amounts of branching.

This invention details synthesis of functionalized polymers and their use in rubber formulation and tire materials. In general to achieve the best tire performance properties functionalized polymers are highly desirable. In order to reduce the rolling resistance and to improve the tread wear characteristics of tires, functionalized elastomers having a high rebound physical property (low hysteresis) have been used for the tire tread rubber compositions. However, in order to increase the wet skid resistance of a tire tread, rubbery polymers that have a relatively lower rebound physical property (higher hysteresis) which thereby undergo a greater energy loss, have sometimes been used for such tread rubber compositions. To achieve such relatively inconsistent viscoelastic properties for the tire tread rubber compositions, blends (mixtures) of various types of synthetic and natural rubber can be utilized in tire treads.

Functionalized rubbery polymers made by living polymerization techniques are typically compounded with sulfur, accelerators, antidegradants, a filler, such as carbon black, silica or starch, and other desired rubber chemicals and are then subsequently vulcanized or cured into the form of a useful article, such as a tire or a power transmission belt. It has been established that the physical properties of such cured rubbers depend upon the degree to which the filler is homogeneously dispersed throughout the rubber. This is in turn related to the level of affinity that filler has for the particular rubbery polymer. This can be of practical importance in improving the physical characteristics of rubber articles which are made utilizing such rubber compositions. For example, the rolling resistance and traction characteristics of tires can be improved by improving the affinity of carbon black and/or silica to the rubbery polymer utilized therein. Therefore, it would be highly desirable to improve the affinity of a given rubbery polymer for fillers, such as carbon black and silica.

In tire tread formulations, better interaction between the filler and the rubbery polymer results in lower hysteresis and consequently tires made with such rubber formulations have lower rolling resistance. Low tan delta values at 60° C. are indicative of low hysteresis and consequently tires made utilizing such rubber formulations with low tan delta values at 60° C. normally exhibit lower rolling resistance. Better interaction between the filler and the rubbery polymer in tire tread formulations also typically results higher tan delta values at 0° C. which is indicative of better traction characteristics.

The interaction between rubber and carbon black has been attributed to a combination of physical absorption (van der Waals force) and chemisorption between the oxygen containing functional groups on the carbon black surface and the rubber (see D. Rivin, J. Aron, and A. Medalia, Rubber Chem. & Technol. 41, 330 (1968) and A. Gessler, W. Hess, and A Medalia, Plast. Rubber Process, 3, 141 (1968)). Various other chemical modification techniques, especially for styrene-butadiene rubber made by solution polymerization (S-SBR), have also been described for reducing hysteresis loss by improving polymer-filler interactions. In one of these techniques, the solution rubber chain end is modified with aminobenzophenone. This greatly improves the interaction between the polymer and the oxygen-containing groups on the carbon black surface (see N. Nagata, Nippon Gomu Kyokaishi, 62, 630 (1989)). Tin coupling of anionic solution polymers is another commonly used chain end modification method that aids polymer-filler interaction supposedly through increased reaction with the quinone groups on the carbon black surface. The effect of this interaction is to reduce the aggregation between carbon black particles which in turn, improves dispersion and ultimately reduces hysteresis.

SUMMARY OF THE INVENTION

The subject invention provides for the end-group functionalization of rubbery living polymers to improve their affinity for fillers, such as carbon black and/or silica. Such functionalized polymers can be beneficially used in manufacturing tires and other rubber products where improved polymer/filler interaction is desirable. In tire tread compounds this can result in lower polymer hysteresis which in turn can provide a lower level of tire rolling resistance.

The present invention is directed to a functionalized elastomer having the formula

(P-B$_n$)$_q$-X where P is a polydiene segment, B is a styrenic monomer residue, n is the number of styrenic monomer residues, and B$_n$ is a polystyrenic segment; X is a multifunctional terminator residue, and q is the number of (P-B$_n$) chains coupled to X; wherein for q=1, the weight percent of the functionalized elastomer is at least 90 percent by weight.

The invention is further directed to a rubber composition comprising the functionalized elastomer, and a pneumatic tire comprising the rubber composition.

The invention is further directed to a method of making the functionalized elastomer.

DETAILED DESCRIPTION OF THE INVENTION

There is disclosed a functionalized elastomer having the formula

$(P-B_n)_q-X$ where P is a polydiene segment, B is a styrenic monomer residue, n is the number of styrenic monomer residues, and $B_n$ is a polystyrenic segment; X is a multifunctional terminator residue, and q is the number of $(P-B_n)$ chains coupled to X; wherein for q=1, the weight percent of the functionalized elastomer is at least 90 percent by weight.

There is further disclosed a rubber composition comprising the functionalized elastomer, and a pneumatic tire comprising the rubber composition.

There is further disclosed a method of making the functionalized elastomer.

The subject invention provides a means for the end-group functionalization of rubbery living polymers to improve their affinity for fillers, such as carbon black and/or silica. The process of the present invention can be used to functionalize any living polymer which is terminated with a metal of group I or II of the periodic table. These polymers can be produced utilizing techniques that are well known to persons skilled in the art. The metal terminated rubbery polymers that can be functionalized with a terminator of formula I in accordance with this invention can be made utilizing monofunctional initiators having the general structural formula P-M, wherein P represents a polymer chain and wherein M represents a metal of group I or II.

The invention provides a method of making a functionalized elastomer, comprising the steps of polymerizing a diene based monomer in the presence of an anionic polymerization initiator to produce a polydiene anionic living polymer; further polymerizing the polydiene anionic living polymer with from 1 to 10 equivalents of a styrenic monomer per equivalent of initiator to produce a polydiene-polystyrenic anionic living polymer; and terminating the polydiene-polystyrenic anionic living polymer with a multifunctional terminator.

The initiator used to initiate the polymerization employed in synthesizing the living rubbery polymer that is functionalized in accordance with this invention is typically selected from the group consisting of barium, lithium, magnesium, sodium, and potassium. Lithium and magnesium are the metals that are most commonly utilized in the synthesis of such metal terminated polymers (living polymers). Normally, lithium initiators are more preferred.

Organolithium compounds are the preferred anionic initiators for utilization in such polymerizations. The organolithium compounds which are utilized as initiators are normally organo monolithium compounds. The organolithium compounds which are preferred as initiators are monofunctional compounds which can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of preferred butyllithium, secbutyllithium, n-hexyllithium, n-octyllithium, tertoctyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium. Secondary-butyllithium is a highly preferred organolithium initiator. Very finely divided lithium having an average particle diameter of less than 2 microns can also be employed as the initiator for the synthesis of living rubbery polymers that can be functionalized with a terminator of formula I in accordance with this invention. U.S. Pat. No. 4,048,420, which is incorporated herein by reference in its entirety, describes the synthesis of lithium terminated living polymers utilizing finely divided lithium as the initiator. Lithium amides can also be used as the initiator in the synthesis of living polydiene rubbers (see U.S. Pat. No. 4,935,471 the teaching of which are incorporated herein by reference with respect to lithium amides that can be used as initiators in the synthesis of living rubbery polymer).

The amount of organolithium initiator utilized will vary depending upon the molecular weight which is desired for the rubbery polymer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

Many types of unsaturated monomers which contain carbon-carbon double bonds can be polymerized into polymers using such metal catalysts. Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Some representative examples of conjugated diene monomers that can be polymerized into rubbery polymers include 1,3-butadiene, isoprene, 1,3-pentadiene, 2,3-dimethyl-1,3-butadiene, 2-methyl1,3-pentadiene, 2,3-dimethyl-1,3-pentadiene, 2-phenyl-1,3-butadiene, and 4,5-diethyl-1,3-octadiene.

Anionic polymerization generally proceeds through addition of the initiator to the desired monomer or monomers in a hydrocarbon solvent in the presence of a polymerization modifier, such as TMEDA or the like. Typically, after polymerization is complete as indicated by depletion of the monomers, a polymerization terminator is added to cease polymerization. The polymerization terminator may be monofunctional in the sense that it may terminate only one polymer chain. A chain terminated by a terminator not terminating or otherwise bound to other polymer chains may be referred to as a monochain. The polymerization terminator may be multifunctional in that a single terminator molecule may terminate or be otherwise bound to one or more polymer chains. Chains terminated to a common terminator may be referred to as coupled polymer chains.

In the present invention, it has been found that addition of a relatively small amount of vinyl-substituted aromatic monomer, i.e, a styrenic monomer, after completion of polymerization of the initial monomers, but before addition of a multifunctional terminator, favors formation of monochains rather than coupled chains. In other words a styrenic monomer is added to the polydiene anionic living polymer, after completion of diene monomer polymerization, to form a polydiene-polystyrenic anionic living polymer. The multifunctional terminator is then added to the polydiene-polystyrenic anionic living polymer, to terminate polymerization. In one embodiment, a functionalized elastomer of the present invention will have more than 90 percent of the polymer existing as monochains, as determined by gel permeation chromatography (GPC). In one embodiment, a functionalized elastomer of the present invention will have more than 95 percent of the polymer existing as monochains. In one embodiment, a functionalized elastomer of the present invention will have more than 98 percent of the polymer existing as monochains.

Some representative examples of styrenic monomers that can be utilized in the synthesis of rubbery polymers include styrene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, α-methylstyrene, and the like.

The metal terminated rubbery polymers that are functionalized with a multifunctional terminator in accordance with this invention are generally prepared by anionic solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

The metal terminated living rubbery polymers utilized in the practice of this invention can be of virtually any molecular weight. However, the number average molecular weight of the living rubbery polymer will typically be within the range of about 50,000 to about 500,000. It is more typical for such living rubbery polymers to have number average molecular weights within the range of 100,000 to 250,000.

The metal terminated living rubbery polymer can be functionalized by simply adding a stoichiometric amount of a multifunctional terminator to a solution of the rubbery polymer (a rubber cement of the polydiene-polystyrenic anionic living polymer). In other words, approximately one mole of the multifunctional terminator is added per mole of terminal metal groups in the living rubbery polymer. The number of moles of metal end groups in such polymers is assumed to be the number of moles of the metal utilized in the initiator. It is, of course, possible to add greater than a stoichiometric amount of the multifunctional terminator. However, the utilization of greater amounts is not beneficial to final polymer properties. Nevertheless, in many cases it will be desirable to utilize a slight excess of the multifunctional terminator to insure that at least a stoichiometric amount is actually employed or to control the stoichiometry of the functionalization reaction. In most cases from about 1.0 to about 2 moles of the multifunctional terminator will be utilized per mole of metal end groups in the living polymer being treated. In the event that it is not desired to functionalize all of the metal terminated chain ends in a rubbery polymer then, of course, lesser amounts of the multifunctional terminator can be utilized.

The multifunctional terminator will react with the metal terminated living rubbery polymer over a very wide temperature range. For practical reasons the functionalization of such living rubbery polymers will normally be carried out at a temperature within the range of 0° C. to 150° C. In order to increase reaction rates, in most cases it will be preferred to utilize a temperature within the range of 20° C. to 100° C. with temperatures within the range of 50° C. to 80° C. being most preferred. The capping reaction is very rapid and only very short reaction times within the range of 0.5 to 4 hours are normally required. However, in some cases reaction times of up to about 24 hours may be employed to insure maximum conversions.

In one embodiment, the multifunctional terminator is a polymerization terminator of formula I

wherein $R^1$ is C1 to C4 linear alkyl, or C1 to C4 branched alkanediyl;
in formula I $X^1$, $X^2$, $X^3$ are independently S, a group of formula II, or a group of formula III;

where $R^2$ is C1 to C18 linear or branched alkyl;
Z is $R^3$, $-OR^4$, or $-R^5-X^4$; $R^3$, $R^4$ are independently C1 to C18 linear or branched alkyl; $R^5$ is C1 to C18 alkanediyl or dialkyl ether diyl, with the proviso when $R^5$ is C1 to C18 dialkyl ether diyl, $X^1$, $X^2$, $X^3$ may be independently O, S, a group of formula II, or a group of formula III;
$X^4$ is halogen or a group of structure IV, V, VI, VII or VIII

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl; $X^5$, $X^6$, $X^7$ are independently O, S, or a group of formula II or III where $R^2$ is C1 to C18 linear or branched alkyl;

Q is N or a group of structure IX

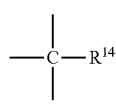
(IX)

wherein $R^{14}$ is C1 to C8 alkyl.

In one embodiment, the terminator of formula I has one of the structures shown in Table 1.

In another embodiment, the multifunctional terminator may be tetraethyl orthosilicate (TEOS), other tetraalkoxy silanes, trialkoxy silanes or dialkoxy silanes.

After the functionalization reaction is completed, it will normally be desirable to "kill" any living polydiene chains which remain. This can be accomplished by adding an alcohol, such as methanol or ethanol, to the polymer cement after the functionalization reaction is completed in order to eliminate any living polymer that was not consumed by the reaction with the terminator of formula I. The end-group functionalized polydiene rubber can then be recovered from the solution utilizing standard techniques.

TABLE 1

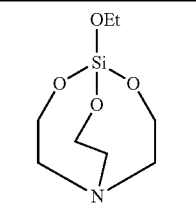
ESTE

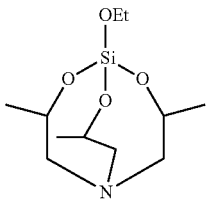
ESTI

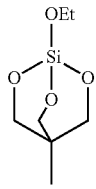
ESTM

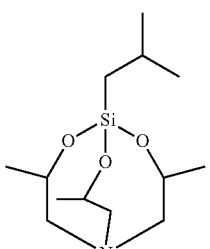
BSTI

TABLE 1-continued

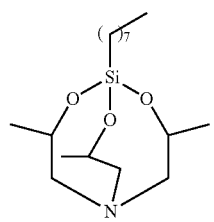
OSTI

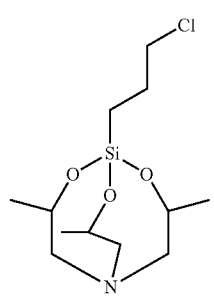
CSTI

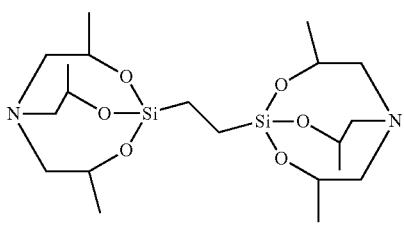 [SMILES: CC1CN2CC(C)O[Si](CC[Si]34OC(C)CN(CC(C)O3)CC(C)O4)(O1)OC(C)C2]
BIPOS

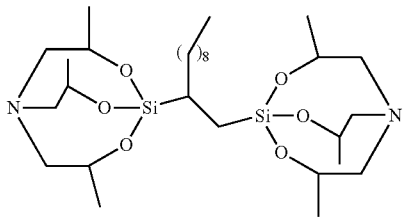
BIDECS

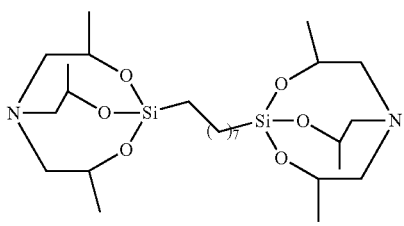
BIOCTS

TABLE 1-continued

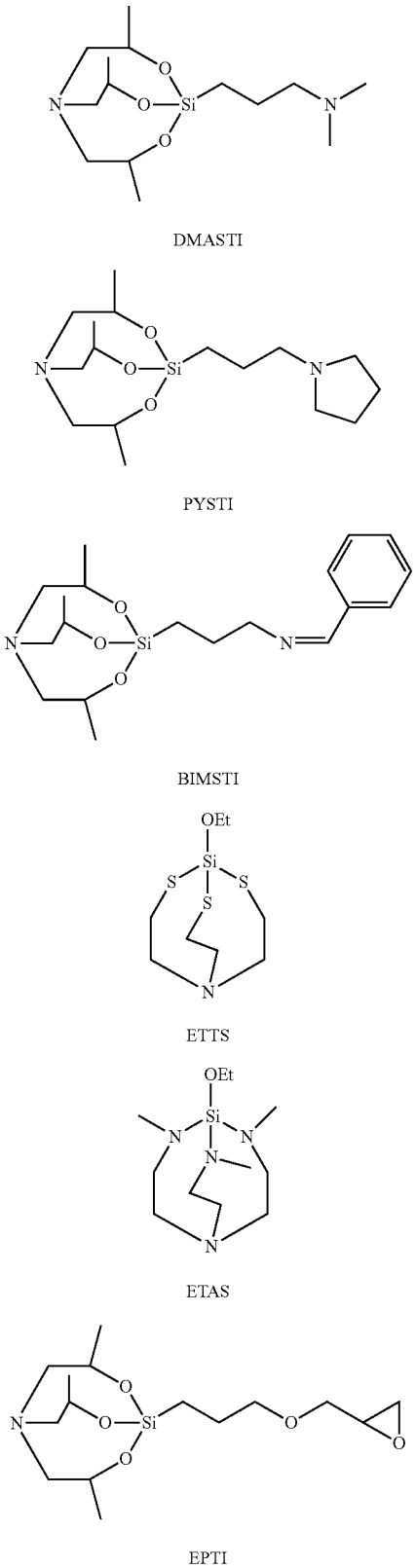

ESTE: 1-ethoxy-2,8,9-trioxa-5-aza-1-silabicyclo[3.3.3]undecane, or ethoxysilatrane
ESTI: 1-ethoxy-3,7,10-trimethyl-2,8,9-trioxa-5-aza-1-silabicyclo[3.3.3]undecane, or 1-ethoxy-3,7,10-trimethylsilatrane
ESTM: 1-ethoxy-4-methyl-2,6,7-trioxa-1-silabicyclo[2.2.2]octane

TABLE 1-continued

BSTI: 1-isobutyl-3,7,10-trimethyl-2,8,9-trioxa-5-aza-1-silabicyclo[3.3.3]undecane, or 1-isobutyl-3,7,10-trimethylsilatrane
OSTI: 1-octyl-3,7,10-trimethyl-2,8,9-trioxa-5-aza-1-silabicyclo[3.3.3]undecane, or 1-octyl-3,7,10-trimethylsilatrane
CSTI: 1-(3-chloropropyl)-3,7,10-trimethyl-2,8,9-trioxa-5-aza-1-silabicyclo[3.3.3]undecane, or 1-(3-chloropropyl)-3,7,10-trimethylsilatrane
BIPOS: 1,2-bis(3,7,10-trimethyl-2,8,9-trioxa-5-aza-1-silabicyclo[3.3.3]undecan-1-yl)ethane, or 1,2-bis(3,7,10-trimethylsilatrane)ethane
BIDECS: 1,1'-(decane-1,2-diyl)bis(3,7,10-trimethyl-2,8,9-trioxa-5-aza-1-silabicyclo[3.3.3]undecane), or 1,1'-(decane-1,2-diyl)bis(3,7,10-trimethylsilatrane)
BIOCTS: 1,8-bis(3,7,10-trimethyl-2,8,9-trioxa-5-aza-1-silabicyclo[3.3.3]undecan-1-yl)octane, or 1,8-bis(3,7,10-trimethylsilatrane)octane
DMASTI: N,N-dimethyl-3-(3,7,10-trimethyl-2,8,9-trioxa-5-aza-1-silabicyclo[3.3.3]undecan-1-yl)propan-1-amine
PYSTI: 3,7,10-trimethyl-1-(3-(pyrrolidin-1-yl)propyl)-2,8,9-trioxa-5-aza-1-silabicyclo[3.3.3]undecane
BIMSTI: N-benzylidene-3-(3,7,10-trimethyl-2,8,9-trioxa-5-aza-1-silabicyclo[3.3.3]undecan-1-yl)propan-1-amine
ETTS: 1-ethoxy-2,8,9-trithia-5-aza-1-silabicyclo[3.3.3]undecane; or 1-ethoxy-thiosilitrane
ETAS: 1-ethoxy-2,8,9-trimethyl-2,5,8,9-tetraaza-1-silabicyclo[3.3.3]undecane; or 1-ethoxy-2,8,9-triazasilatrane
EPTI: 3,7,10-trimethyl-1-(3-(oxiran-2-ylmethoxy)propyl)-2,8,9-trioxa-5-aza-1-silabicyclo[3.3.3]undecane; or 1-(3-(oxiran-2-ylmethoxy)propyl)-3,7,10-trimethylsilatrane The functionalized polymer may be compounded into a rubber composition.

The rubber composition may optionally include, in addition to the functionalized polymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 $cm^3/100$ g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Triisopropanolamine (253.0 g, from Aldrich), tetraethylsilicate (289 g, from Aldrich) and potassium hydroxide (3.7 g, form Aldrich) were mixed in a 1-liter 3-neck round bottle flask equipped with distillation apparatus. The mixture was then heated to 85° C. by heating mantle, and ethanol produced from the reaction was removed under reduced pressure of 200 mmHg. After 2 hour of reaction the pressure was set to 100 mmHg, and the mixture was heated to 120° C. for an additional hour. Total of 230 mL of ethanol was recovered from the distillation. The oily crude product was then distilled out under the pressure of ~2 mmHg and the temperature of 120° C. Total of 305 g (88.2% yield) of white crystalline solid, 1-ethoxy-3,7,10-trimethylsilatrane (ESTI), was obtained. $^1$HNMR and $^{13}$CNMR spectroscopy analysis has shown larger than 95% purity of the desired product. m.p. 80-83° C.

Example 2

In this example, bench scale synthesis of a functionalized elastomer is illustrated. Polymerizations were done in eight-ounce bottles at 65° C. water bath. Monomer premix of styrene and butadiene (100 g, 15 wt %, styrene/butadiene ratio=21/79) was charged into eight-ounce bottle with hexane as solvent followed by addition of modifier (TMEDA, 4 eq/Li eq) and initiator (n-butyllithium, 0.10 mL, 1.6 mol/L). After a polymerization time of 0.5 hour, additional styrene was added (1 wt % of total monomer weight, about 10 units per polymer chain.) The bottle was placed back into the 65° C. water bath for addition 1 hour, and then the polymerizations were terminated with functional terminators 1-ethoxy-3,7,10-trimethylsilatrane (ESTI, 1 eq/Li eq)). Five polymerizations were done with amounts of ESTI and additional styrene given in equivalents per lithium equivalent. In two polymerizations, isopropanol was used as terminator instead of ESTI (Samples 1 and 2).

The polymers obtained were characterized using gel permeation chromatography (GPC) to determine molecular weight (Mn) and fraction of chains existing as mono chains or coupled chains, with results given in Table 1.

The number average molecular weights were measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The detector used is preferably an ultraviolet detector. The fraction of chains existing as mono chains was determined as the ratio of the areas under the GPC curve, i.e., (mono chain peak area)/(total area).

TABLE 1

| Sample No. | ESTI (eq) | Added Styrene (eq) | % Mono Chain | Mn |
|---|---|---|---|---|
| 1 | 0 | 0 | 100 | 88,000 |
| 2 | 0 | 10 | 99.8 | 81,000 |
| 3 | 1 | 0 | 41 | 90,000 |
| 4 | 1 | 10 | 94 | 90,000 |
| 5 | 2 | 10 | 98 | 85,000 |

As seen in Table 1, as expected the polymers terminated with isopropanol showed essentially no coupling (100 and 99.8 percent mono chains in Samples 1 and 2). However, termination with ESTI after complete polymerization in Sample 3 resulted in about 59 percent coupled polymer chains (41 percent mono chains). Addition of 10 eq of styrene after complete polymerization of the initially charged monomers but prior to termination with 1 eq ESTI in Sample 4 resulted in greatly reduced chain coupling (94 percent mono chains). Addition of 2 eq of ESTI after additional 10 eq of styrene in Sample 5 resulted in even greater reduction in chain coupling (98 percent mono chains). The results indicate that the presence of a styrene sequence at the end of the living polymer prior to termination favors the formation of monochains terminally functionalized with ESTI rather than multiple chains coupled to a common ESTI terminator.

Example 3

In this example, polymerization were done in the similar manner as examples 2, except tetraethyl orthosilicate was used as functional terminator. The polymers obtained were characterized by GPC to determine the molecular weight (Mn) and the fraction of chains that being coupled or remain as mono chains, with results given in Table 2.

TABLE 2

| Sample No. | TEOS (eq) | Added Styrene (eq) | % Mono Chain | Mn |
|---|---|---|---|---|
| 6 | 0 | 0 | 99.5 | 115,000 |
| 7 | 0 | 10 | 98.8 | 106,000 |
| 8 | 1 | 0 | 57.3 | 114,000 |
| 9 | 1 | 10 | 91.1 | 101,000 |
| 10 | 2 | 10 | 90.5 | 107,000 |

As seen in Table 2, as repeated experiments of sample 1 and 2, sample 6 and 7 of which polymers terminated with isopropanol showed essentially no coupling (99.5 and 98.8 percent mono chain). However, termination with TEOS after complete polymerization in Sample 8 resulted in about 43 percent coupled polymer chains (57 percent mono chains). Addition of 10 eq of styrene after complete polymerization of the initially charged monomers but prior to termination with 1 eq TEOS in Sample 9 resulted in greatly reduced chain coupling (91 percent mono chains). Addition of 2 eq of TEOS after additional 10 eq of styrene in Sample 10 resulted in similar reduction in chain coupling (91 percent mono chains). The results indicate that the presence of a styrene sequence at the end of the living polymer prior to termination favors the formation of monochains terminally functionalized with TEOS rather than multiple chains coupled to a common TEOS terminator.

While certain representative embodiments and details have been shown for the purpose of illustrating the subject invention, it will be apparent to those skilled in this art that various changes and modifications can be made therein without departing from the scope of the subject invention.

What is claimed is:

1. A method of making a functionalized elastomer, comprising the steps of
   polymerizing a diene based monomer in the presence of an anionic polymerization initiator to produce a polydiene anionic living polymer;
   further polymerizing the polydiene anionic living polymer with from 1 to 10 equivalents of a styrenic monomer per equivalent of initiator to produce a polydiene-polystyrenic anionic living polymer; and
   terminating the polydiene-polystyrenic anionic living polymer with a terminator to form the functionalized elastomer, wherein the terminator is of formula I

wherein $R^1$ is C1 to C4 linear alkyl, or C1 to C4 branched alkanediyl;
in formula I $X^1$, $X^2$, $X^3$ are independently S, a group of formula II, or a group of formula III;

-continued

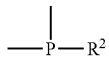   (III)

where $R^2$ is C1 to C18 linear or branched alkyl;
Z is $R^3$, —$OR^4$, or —$R^5$—$X^4$; $R^3$, $R^4$ are independently C1 to C18 linear or branched alkyl; $R^5$ is C1 to C18 alkanediyl or dialkyl ether diyl, with the proviso when $R^5$ is C1 to C18 dialkyl ether diyl, $X^1$, $X^2$, $X^3$ may be independently O, S, a group of formula II, or a group of formula III;
$X^4$ is halogen or a group of structure IV, V, VI, VII or VIII

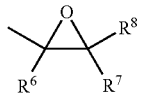   (IV)

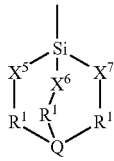   (V)

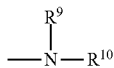   (VI)

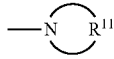   (VII)

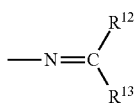   (VIII)

wherein $R^6$, $R^7$, $R^8$, $R^9$, and $R^{10}$ are independently H or C1 to C8 alkyl; $R^{11}$ is C2 to C8 alkanediyl;

$R^{12}$ and $R^{13}$ are independently H, aryl or C1 to C8 alkyl; $X^5$, $X^6$, $X^7$ are independently O, S, or a group of formula II or III where $R^2$ is C1 to C18 linear or branched alkyl;

Q is N or a group of structure IX

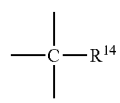   (IX)

wherein $R^{14}$ is C1 to C8 alkyl.

2. The method of claim 1, wherein the diene based monomer is selected from the group consisting of 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene.

3. The method of claim 1, wherein the styrenic monomer is selected from the group consisting of styrene, 3-methylstyrene, 3,5-diethylstyrene, 4-propylstyrene, 2,4,6-trimethylstyrene, 4-dodecylstyrene, 3-methyl-5-normal-hexylstyrene, 4-phenylstyrene, 2-ethyl-4-benzylstyrene, 3,5-diphenylstyrene, 2,3,4,5-tetraethylstyrene, and a-methylstyrene.

4. The method of claim 1, wherein the diene based monomer is selected from the group consisting of 1,3-butadiene and isoprene, and the styrenic monomer is styrene.

5. The method of claim 1, wherein n ranges from 5 to 10.

6. The method of claim 1, wherein the polydiene has a molecular weight Mn ranging from 50K to 500K.

* * * * *